United States Patent [19]

Särkioja et al.

[11] Patent Number: 5,774,808
[45] Date of Patent: Jun. 30, 1998

[54] METHOD FOR CHANNEL ALLOCATION IN A CELLULAR COMMUNICATION SYSTEM

[75] Inventors: Juha Särkioja; Jukka Suonvieri, both of Oulu, Finland

[73] Assignee: Nokia Telecommunications Oy, Espoo, Finland

[21] Appl. No.: 624,471

[22] PCT Filed: Aug. 2, 1995

[86] PCT No.: PCT/FI95/00412

§ 371 Date: Apr. 3, 1996

§ 102(e) Date: Apr. 3, 1996

[87] PCT Pub. No.: WO96/04722

PCT Pub. Date: Feb. 15, 1996

[30] Foreign Application Priority Data

Aug. 3, 1994 [FI] Finland ................................. 943609

[51] Int. Cl.⁶ .................................................. H04Q 7/00
[52] U.S. Cl. ...................... 455/436; 455/440; 455/452; 455/63; 370/332; 375/202
[58] Field of Search .................... 455/422, 436, 455/450, 452, 453, 455, 62, 63, 67.1, 67.3, 67.6, 438, 439, 404, 441, 442, 456; 375/200, 202; 370/329, 330, 331–333, 335, 336, 337, 341, 342

[56] References Cited

U.S. PATENT DOCUMENTS

| | | | |
|---|---|---|---|
| 5,287,544 | 2/1994 | Menich et al. | 455/33.1 |
| 5,293,643 | 3/1994 | Israelsson | 455/33.2 |
| 5,327,576 | 7/1994 | Uddenfeldt et al. | 455/33.2 |
| 5,375,123 | 12/1994 | Anderson et al. | 455/67.3 |
| 5,381,443 | 1/1995 | Borth et al. | 375/1 |
| 5,603,092 | 2/1997 | Stjernholm | 455/63 |

FOREIGN PATENT DOCUMENTS

| | | | |
|---|---|---|---|
| 0 037 070 | 10/1981 | European Pat. Off. | H04B 7/26 |
| 0 637 181 | 2/1995 | European Pat. Off. | H04Q 7/38 |
| 923783 | 2/1993 | Finland | H04B 7/26 |
| 934361 | 4/1994 | Finland | H04B 7/26 |
| 2 694 147 | 1/1994 | France | H04B 17/00 |

*Primary Examiner*—Thanh Cong Le
*Attorney, Agent, or Firm*—IP Group of Pillsbury Madison & Sutro LLP

[57] ABSTRACT

A method for allocating radio channels in a cellular communication system, each cell having at least one base station communicating with the subscriber terminal equipment by means of a traffic channel specific for each connection. The base station monitors the quality of the available traffic channels. For improving the service ability of the cellular communication system, upon selecting the traffic channel for the connection between the base station and the terminal equipment, the quality of the connection required by the terminal equipment and the interference level of each possible traffic channel are taken into account.

8 Claims, 3 Drawing Sheets

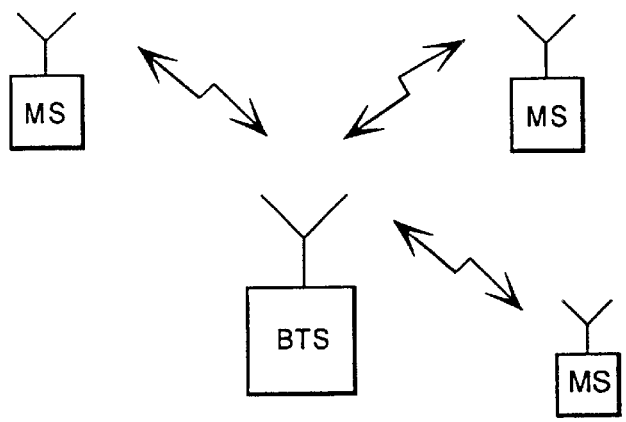
Fig. 1
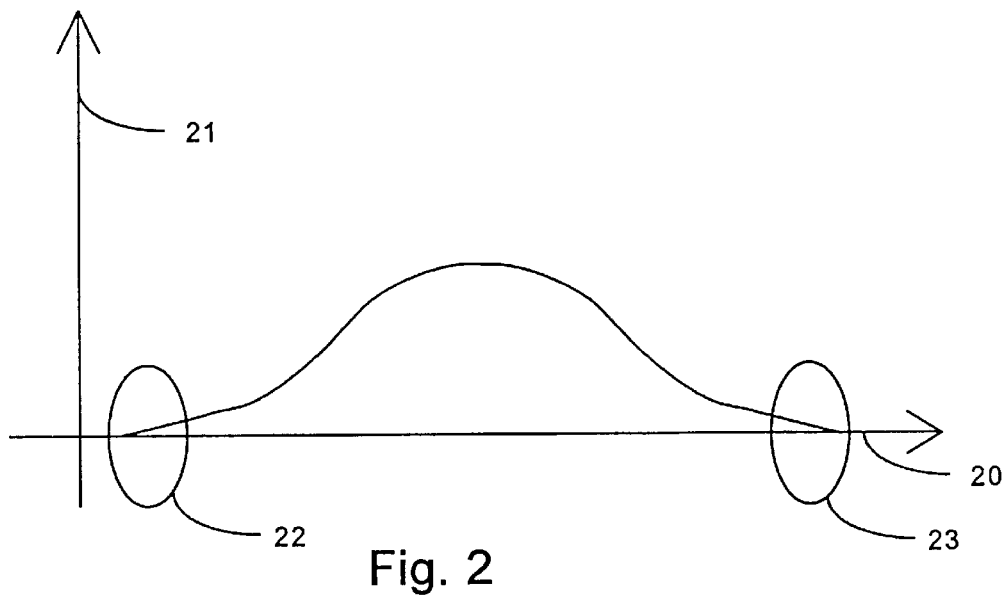
Fig. 2
| TRX | TS0 | TS1 | TS2 | TS3 | TS4 | TS5 | TS6 | TS7 |
|---|---|---|---|---|---|---|---|---|
| 1 BCCH | HG0 | HG2 | | | | | | |
| 2 | HG1 | | | | | | | |
| 3 | | | | | | | | |
| 4 | | | | | | | | |
Fig. 3

| TRX | TS0 | TS1 | TS2 | TS3 | TS4 | TS5 | TS6 | TS7 |
|---|---|---|---|---|---|---|---|---|
| 1 BCCH | HG0 | | | | | | | |
| 2 | HG1 | | | | | | | |

METHOD FOR CHANNEL ALLOCATION IN A CELLULAR COMMUNICATION SYSTEM

This application claims benefit of international application PCT/FI95/00412 filed Aug. 2. 1995.

BACKGROUND OF THE INVENTION

The invention relates to a method for allocating radio channels in a cellular communication system, each cell comprising at least one base station communicating with the subscriber terminal equipment within its area by means of a traffic channel specific for each connection, in which method the base station monitors the quality of the available traffic channels.

In cellular communication systems the quality of the connection between the base station and the subscriber terminal equipment varies as a function of time and location. On average, the more remote the terminal equipment is from the base station, the more signal attenuation occurs on the radio path, but other factors, such as visual obstructions and external interferences also affect the quality of the signal at the receiving end.

The attenuation of the signal also depends on the used frequency. Thus, if the frequency difference between two signals is sufficient, their attenuations do not correlate. For instance, a frequency difference of 1 MHz is sufficient, so that the attenuations of the signals are independent of each other. Due to this frequency-selective attenuation, several cellular communication networks have introduced the frequency hopping technique. This means that the frequency used on the connection is varied at predetermined intervals. Thus, the effect of the frequency-selective attenuation may be averaged, and similarly, the harmful effect of narrowband interference signals on the desired signal is reduced.

In several systems, part of the channels used by the base station are frequency hopping and part of the channels use fixed frequencies. This is necessary since some of the signalling channels must be transmitted on a certain frequency, so that the terminal equipment can find them. Owing to this, among other things, various traffic channels of the base station may have quite different interference levels.

In present systems, when a traffic channel is being allocated for the connection between a terminal equipment and the base station, either in connection with call set-up or handover, those traffic channels are searched from the available traffic channels of the base station which are currently free, and their Idle Channel Interference level is checked. One of those idle channels with the lowest interference level is randomly allocated for the use the terminal equipment.

The drawback of the method described above is that it does not take into account the different character of various channels and the conditions in which each terminal equipment currently exists. The characteristics of various channels are thus not utilized in the best possible way.

SUMMARY OF THE INVENTION

The object of the present invention is thus to implement a new method for channel allocation, with which method the above-mentioned drawbacks may be avoided, and the service ability of the cellular communication system may thus be improved.

This is achieved with a method of the type set forth in the foregoing BACKGROUND section, which is characterized in that upon selecting the traffic channel for the connection between the base station and the terminal equipment, the quality of the connection required by the terminal equipment and the interference level of each possible traffic channel are taken into account.

The method of the invention may be particularly applied so that an attempt is made for providing the connection to be established simply a sufficiently good radio channel. The radio channels may be classified on the basis of the interference level obtained by means of measurements, and of the effect of frequency hopping. A traffic channel enabling a high quality of the connection may be given to a terminal equipment behind a poor connection, whereas, for instance, a traffic channel containing more interference may be given to a terminal equipment located near the base station, since the quality of the connection is sufficient in any case. Thus, the characteristics of the channels may be effectively utilized, and the quality and the success probability of the calls of the system are higher than what has been possible before.

BRIEF DESCRIPTION OF THE DRAWINGS

In the following, the invention will be described in closer detail with reference to the examples in accordance with the attached drawings, in which:

FIG. 1 shows a diagram of a cellular communication system in which the method of the invention may be applied, FIG. 2 shows a diagram of the levels of the connections within the area of a base station, FIG. 3 illustrates an example of a possible frequency group division of a base station.

DETAILED DESCRIPTION

FIG. 1 illustrates a cellular communication system in which the method of the invention may be applied. The cellular communication system comprises a base station BTS which communicates with the subscriber terminal equipments MS within its area, so that each terminal equipment has a traffic channel of its own.

FIG. 2 illustrates the basic idea of the method of the invention. The figure shows a diagram of the level of the connection of the calls maintained by one base station. The horizontal axis 20 of the diagram represents the quality of the calls, which can be measured, e.g. by means of the bit-error ratio. The vertical axis of the diagram represents the number of the calls. In a normal case, in which there is a plurality of calls, the quality distribution is similar to the case shown in the figure, resembling the Gauss curve. In the method of the invention, the terminal equipments 22 having a poor quality of a connection are allocated in the base station such a traffic channel that has a low interference level. Accordingly, the terminal equipments 23 having a high quality of a connection may be allocated a traffic channel with a higher interference level.

In the following, the invention will be described in greater detail, by way of example of the digital GSM cellular communication system in which frequency hopping is used. However, the invention is not limited thereto, since the invention may also be applied in other cellular communication systems.

When frequency hopping is applied on the radio path, the traffic channels used by the base station may be divided into groups having different frequency-hopping parameters. These groups are termed as hopping groups. In the GSM system, division into groups of this kind is necessary owing to the special characteristics of the carrier wave frequency contained by the BCCH signalling channel. The BCCH signal must be on a frequency that is known to all terminal equipment all the time, and the channel in question thus does not frequency hop. Furthermore, the BCCH frequency is continuously transmitted with the highest allowable transmission power.

FIG. 3 illustrates an example of a typical frequency group division in a base station which comprises four transmitter units TRX, the first of which transmits a BCCH signal in a first time-slot TS0. The traffic channels are divided into three hopping groups: HG0, HG1 and HG2. The first group comprises the time-slot TS0 of the first transmitter TRX1; this time-slot comprises the BCCH signal and it does not hop. The second group comprises the first time-slots TS0 of the other transmitters TRX2 . . . TRX4, which time-slots hop by using three frequencies of the respective transmitters. The third hopping group comprises other time-slots that frequency hop by using four frequencies.

Figures 4, 5:
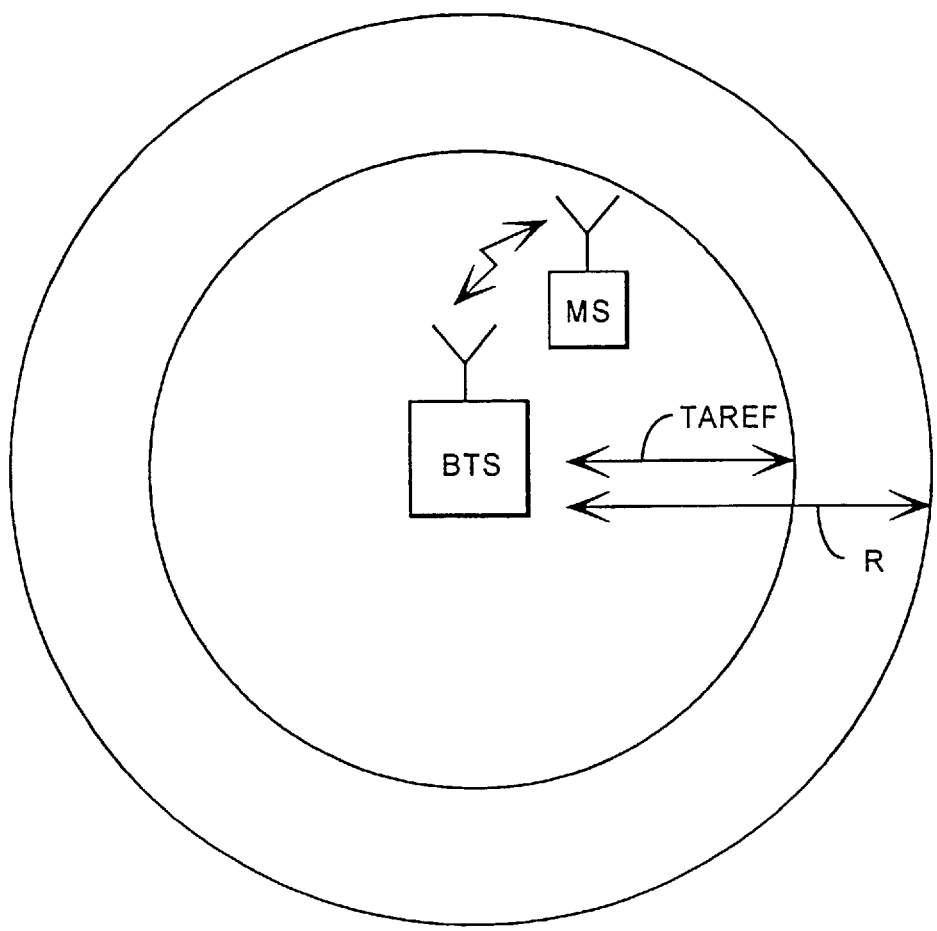
FIG. 4 illustrates a second example of a possible frequency group division of a base station.
FIG. 5 illustrates an example of the effect of the location of a terminal equipment on channel allocation.

In the frequency group arrangement described above, only the number of frequencies corresponding to the number of separate transmitters is used. It is also possible to apply so-called synthesized hopping, which is carried out by means of fast-tunable voltage controlled oscillators. It is then possible to control the operation of each transmitter, so that it can change the transmission frequency specifically in each time-slot. It is then possible to use more frequencies than there are transmitters in the base station. A frequency group division of this kind is illustrated in FIG. 4.

In the base station in accordance with the example, only two transmitters TRX1 and TRX2 are in use. The traffic channels are divided into two hopping groups HG0 and HG1. All time-slots of the second transmitter belong to hopping group HG1, and it is assumed that they hop on four frequencies by using synthesized hopping. So that all time-slots of the second transmitter have a free access to the most of the frequencies, all time-slots of the first transmitter TRX1 are transmitted on a fixed frequency due to the special requirements of the BCCH channel.

The frequency arrangement described above is advantageous in a small base station, but it leads to a situation in which a half of the traffic channels are hopping, and another half of the channels are on a fixed frequency. The base station thus has traffic channels of two kinds, the characteristics of which differ from each other a great deal as to interferences and propagation conditions.

The method of the invention may be applied particularly advantageously in a base station of the kind described above, since traffic channels of various types may effectively be utilized so that each connection is allocated such a channel the characteristics of which are the best from the point of view of the totality.

In a preferred embodiment of the method of the invention, upon selecting the traffic channel for the connection between the terminal equipment and the base station, the quality of the signal received at the base station and at the terminal equipment is taken into account, as well as the power level of the connection measured both at the terminal equipment and the base station, the distance of the terminal equipment from the base station, the interference level of free traffic channels, and the signal-to-noise ratio required for a sufficient signal quality. The signal-to-noise ratio is a system parameter and depends, e.g., on the used modulation and coding methods.

The quality of the received signal at the base station and the terminal equipment may be measured, e.g. by means of the bit-error ratio. The distance of the terminal equipment from the base station is indicated by the timing advance parameter (TA), which is used for replacing the propagation delay occurring on the radio path.

The need for allocating channels in cellular communication systems arises in three possible situations: in connection with call set-up, intracell handover, and inter-cell handover. In the following, applying the method of the invention will be described separately for each case.

Call Set-up

In connection with call set-up, the decision on the channel type (hopping or non-hopping) to be allocated for a terminal equipment must be made relatively quickly compared with the time that passes until reliable measurement results of the signal quality and the received power are obtained on different channel types. Therefore, the only available parameters that may be taken into account when channel allocation is carried out are the idle channel interference level (ICIL) and the timing advance (TA) indicating the distance.

Since there are no accurate measurement results of the conditions of the terminal equipments in connection with call set-up yet, a non-hopping traffic channel should be allocated for use only if the available information indicates that the terminal equipment is in highly favorable conditions, i.e. in the vicinity of the base station, and there is a non-hopping traffic channel free of interference available. It can be applied as a basic rule that in connection with call set-up, a frequency-hopping traffic channel is selected if the interference of the free channel is not higher than that of any other non-hopping channel. Expressed as an algorithm:

If $ICIL(HCH) \leq ICIL(NHCH)$, then select HCH else select NHCH;

in which HCH represents a hopping channel and NHCH a non-hopping channel.

The distance of the terminal equipment can also be taken into account when the channel is being allocated. The importance of the distance varies depending on the cell size and the environment. FIG. 5 illustrates one possible way of implementation for taking the distance into account. The figure shows a base station BTS, and the radius of its audibility range is marked with R. A terminal equipment MS is within the audibility range of the base station setting up a connection with the base station. The operator of the system may set the system parameter TAREF which indicates with the aid of the timing advance the distance within the limits of which the terminal equipments may be assigned a non-hopping traffic channel, provided that the interference of the free non-hopping channel is not higher than that on any other channel. Expressed in a form of an algorithm:

If $TA < TAREF$ and $ICIL(NHCH) \leq ICIL(HCH)$, then select NHCH else select HCH.

The above-discussed algorithms favor frequency-hopping traffic channels, which means that once a call has been set up, an intracell handover is carried out onto a non-hopping frequency on connections that have proved to be good, so that there are always hopping traffic channels available for new connections.

Intracell Handover

An object of the intracell handover is to provide a better traffic channel for use of a terminal equipment having a poor connection. Furthermore, in the method of the invention, the traffic load between hopping and non-hopping channels is evened out by means of the intracell handover.

The criteria applied in the intracell handover depend on whether a hopping or a non-hopping traffic channel is in use.

A few seconds after a connection has been set up between the terminal equipment and the base station, reliable and averaged measurement results of the quality of the connection and the power level both at the base station and the subscriber terminal equipment are obtained. In most cases where frequency hopping is of avail, the improvement is noticed in the quality of the received signal. This quality may be used as the main criterion in the intracell handover.

The following four presettable threshold values may be used as criteria in connection with handover:

RX_QUAL_HO_HCH_DL: the threshold value of the quality of the signal received at the base station when an intracell handover from a hopping channel onto a non-hopping channel is carried out.

RX_QUAL_HO_NHCH_DL: the threshold value of the quality of the signal received at the base station when an intracell handover from a non-hopping channel onto a hopping channel is carried out.

RX_QUAL_HO_HCH_UL: the threshold value of the quality of the signal received at the terminal equipment when an intracell handover from a hopping channel onto a non-hopping channel is carried out.

RX_QUAL_HO_NHCH_UL: the threshold value of the quality of the signal received at the terminal equipment when an intracell handover from a non-hopping channel onto a hopping channel is carried out.

If the terminal equipment is on a hopping traffic channel, in a preferred embodiment of the invention the handover is carried out onto a non-hopping channel if the quality of the signal received by the base station from the terminal equipment is higher than the preset threshold value and if the quality of the signal received by the terminal equipment from the base station is higher than the preset threshold value. The quality of the connection must thus be high in both transmission directions. Expressed in a form of an algorithm, using the above abbreviations:

If RX_QUAL_DL<RX_QUAL_HO_HCH_DL
and RX_QUAL_UL<RX_QUAL_HO_HCH_UL
then execute handover HCH→NHCH.

If the terminal equipment is on a non-hopping traffic channel, in a preferred embodiment of the invention the handover is carried out onto a hopping channel provided that either the quality of the signal received by the base station from the terminal equipment is poorer than the preset threshold value or the quality of the signal received by the terminal equipment from the base station is poorer than the preset threshold value. The handover thus takes place if the transmission quality is poor in either of the transmission directions. Expressed as an algorithm, using the above abbreviations:

If RX_QUAL_DL>RX_QUAL_HO_NHCH_DL
or RX_QUAL_UL>RX_QUAL_HO_NHCH_UL
then execute handover NHCH→HCH.

When the above statements are true, i.e. the handover is carried out, a new traffic channel will be selected from the free traffic channels included in another hopping group. Prior to the handover it must first be checked that on the new channel the interference of the free channel is sufficiently low.

The latter of the above discussed algorithms is also responsible for that the terminal equipment switches from a non-hopping channel onto a hopping channel when the terminal equipment moves away from the base station and the quality of the connection weakens due to a low signal strength.

Let us assume, for instance, that the preset parameters have the following values:

RX_QUAL_HO_HCH_DL: 1
RX_QUAL_HO_NHCH_DL: 3
RX_QUAL_HO_HCH_UL: 1
RX_QUAL_HO_NHCH_UL: 3.

With these exemplary settings, the call shifts from a hopping channel onto a non-hopping channel if the averaged quality of the connection is zero in both directions, i.e. the bit-error ratio BER<0.2%. The call shifts from a non-hopping channel onto a hopping channel if the averaged quality of the connection is poorer than 3, i.e. BER>1.6% in either of the transmission directions.

Inter-cell Handover

Figure 6:
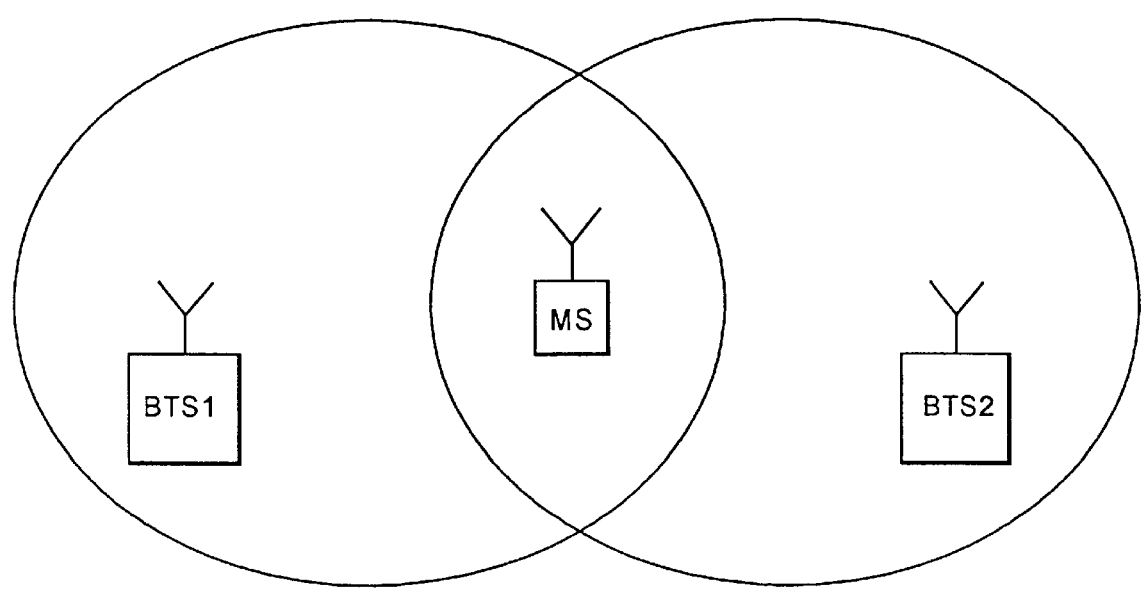
FIG. 6 illustrates a situation where handover is carried out in the boundary area between two base stations.

The need for intercell handover arises mostly when the terminal equipment MS is moving in accordance with FIG. 6 from the area served by base station BTS1 to the audibility area served by another base station BTS2. The handover frequently takes place in a location where the terminal equipment is located remote from the target base station, and the probability that a good traffic channel is required is high. In the method of the invention, a frequency-hopping traffic channel is assigned for the terminal equipment in the inter-cell handover if there is one available.

In the above description, applying the invention in a system utilizing the frequency hopping technique is described. However, the method of the invention may also be applied in such a cellular communication system in which frequency hopping is not in use. Owing to the propagation of radio waves, various carrier wave frequencies may have different values from the point of view of the interferences. Channel allocation for various connections may be carried out on the basis of interference measurements onto different frequencies, so that a connection having a poor quality of transmission is assigned a carrier wave frequency provided by a higher transmission quality.

Although the invention has been described above with reference to the examples in accordance with the accompanying drawings, it is obvious that the invention is not limited thereto, but it may be modified in various ways within the scope of the inventive idea set forth in the attached claims.

We claim:

1. A method for allocating radio channels in a cellular communication system in which each cell has at least one base station communicating with the subscriber terminal equipment within a respective area by use of a traffic channel specific for each connection, comprising:

at least one said base station having a plurality of traffic channels, on at least part of which frequency hopping is used, monitoring the quality of available traffic channels; and in connection with selecting a traffic channel for respective connections between said base station and respective terminal equipment, taking into account the quality of the respective connection required by each terminal equipment and the interference level of each possible traffic channel, taking into account the quality of the signal received at said base station and at the respective terminal equipment, and taking into account the power level of the signal received at said base station and the respective terminal equipment, the distance of the respective terminal equipment from said base station, the interference level of free traffic channels, and the signal-to-noise ratio required for a sufficient signal quality at the receiving end.

2. The method as claimed in claims 1, wherein:

said selecting includes allocating a radio channel more susceptible to interference for a respective said terminal equipment having a good radio connection than for a respective said terminal equipment having a poor connection.

3. The method as claimed in claim 1, wherein:

at least one of said traffic channels is a non-hopping channel, and, in connection with call set-up, assigning a frequency-hopping traffic channel to the respective terminal equipment, provided that none of the non-hopping channels has a lower interference level than a hopping channel.

4. The method as claimed in claim 1, wherein:

at least one of said traffic channels is a non-hopping channel, and, provided that the respective terminal equipment is closer to said base station than a predetermined distance, and none of the hopping channels has a lower interference level than a non-hopping channel, assigning a non-hopping traffic channel to the respective terminal equipment in connection with the call set-up.

5. The method as claimed in claim 1, wherein:

at least one of said traffic channels is a non-hopping channel, and, provided that the quality of the signal received by said base station from the respective terminal equipment is better than a preset threshold value, and the quality of the signal received by the respective terminal equipment from said base station is higher than a preset threshold value and a frequency-hopping traffic channel is in use, carrying out intracell handover onto a non-hopping traffic channel.

6. The method as claimed in claim 1, wherein:

at least one of said traffic channels is a non-hopping channel, and, provided that either the quality of the signal received by said base station from the respective terminal equipment is poorer than a preset threshold value, or the quality of the signal received by the respective terminal equipment from said base station is poorer than a preset threshold value and a non-hopping traffic channel is in use, carrying out intracell handover onto a hopping traffic channel.

7. The method as claimed in claim 1, wherein:

when the respective terminal equipment is carrying out a handover from another base station to said base station, allocating a frequency hopping traffic channel for the terminal equipment at said base station.

8. The method as claimed in claim 1, wherein:

said cellular communication system is a GSM system.

* * * * *